United States Patent
Peterson et al.

(10) Patent No.: US 6,590,496 B2
(45) Date of Patent: Jul. 8, 2003

(54) RAPID THREAT RESPONSE FOR MINIMIZING HUMAN CASUALTIES WITHIN A FACILITY

(75) Inventors: Edward W. Peterson, Del Mar, CA (US); Richard A. Grot, San Diego, CA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/731,954

(22) Filed: Dec. 6, 2000

(65) Prior Publication Data

US 2002/0084900 A1 Jul. 4, 2002

Related U.S. Application Data

(60) Provisional application No. 60/169,530, filed on Dec. 6, 1999.

(51) Int. Cl.⁷ ............................................. G08B 19/00
(52) U.S. Cl. ........................ 340/522; 340/506; 340/517; 340/521
(58) Field of Search ..................... 340/573.1, 506, 340/522, 523, 525, 584, 628, 641.3, 691.6, 578, 636, 539, 310.06, 517; 187/390; 702/1; 705/9; 236/49.1; 165/281; 62/176.6; 454/322

(56) References Cited

U.S. PATENT DOCUMENTS

| | | | |
|---|---|---|---|
| 4,023,146 A | 5/1977 | Carroll | 340/172.5 |
| 4,058,253 A | 11/1977 | Munk et al. | 236/46 R |
| 4,365,504 A * | 12/1982 | Haines et al. | 73/1.29 |
| 4,536,747 A | 8/1985 | Jensen | 340/502 |
| 4,749,985 A | 6/1988 | Corsberg | 340/517 |
| 4,962,473 A | 10/1990 | Crain | 340/541 |
| 5,024,263 A | 6/1991 | Laine et al. | 165/283 |
| 5,121,344 A | 6/1992 | Laage et al. | 702/33 |
| 5,228,306 A | 7/1993 | Shyu et al. | 62/176.6 |
| 5,349,644 A * | 9/1994 | Massey et al. | 340/310.06 |
| 5,381,338 A * | 1/1995 | Wysocki et al. | 701/207 |
| 5,602,564 A * | 2/1997 | Iwamura et al. | 345/782 |
| 5,628,050 A | 5/1997 | McGraw et al. | 455/12.1 |
| 5,654,690 A | 8/1997 | Ishikawa et al. | 340/506 |
| 5,674,125 A | 10/1997 | Xia et al. | 454/327 |
| 5,726,884 A | 3/1998 | Sturgeon et al. | 705/9 |
| 5,761,908 A | 6/1998 | Oas et al. | 62/3.2 |
| 5,977,872 A | 11/1999 | Guertin | 340/515 |
| 5,979,607 A | 11/1999 | Allen | 187/390 |
| 6,057,549 A * | 5/2000 | Castleman | 250/339.15 |

FOREIGN PATENT DOCUMENTS

GB   2220288 A * 1/1990 ........... G08B/21/00

OTHER PUBLICATIONS

PCT Written Opinion, PCT/US00/42582, filed on Dec. 6, 2000.
International Search Report for Application No. PCT/US00/42588, dated Jun. 8, 2001 (date of Mailing).
International Search Report for Application No. PCT/US00/42582, dated Jun. 13, 2001 (date of mailing).

* cited by examiner

*Primary Examiner*—Van Trieu
(74) *Attorney, Agent, or Firm*—Kilpatrick Stockton LLP

(57) ABSTRACT

A method and apparatus are described for responding to an emergency at a facility by analyzing a plurality of threat conditions to determine possible responses to an emergency and selecting a response to the emergency for minimizing human casualties within the facility. The present invention may be characterized in one embodiment as a method for generating an automated response to an emergency that includes the steps of (a) receiving as input threat condition data for a facility; (b) analyzing the threat condition data to determine a matrix of possible responses to an emergency; and (c) selecting a response from the matrix of possible responses to minimize human casualties.

5 Claims, 18 Drawing Sheets

RAPID THREAT RESPONSE FOR MINIMIZING HUMAN CASUALTIES WITHIN A FACILITY

CROSS-REFERENCE TO RELATED APPLICATIONS

This application claims priority under 35 USC §119(e) to U.S. Provisional Patent Application Serial No. 60/169,530 of Peterson, et al, for RAPID EVALUATION OF AND RESPONSE TO THREATS AT FACILITIES, filed Dec. 6, 1999, incorporated herein by reference as if set forth in its entirety. This application is also related to U.S. Utility patent application Ser. No. 09/732,175 now U.S. Pat. No. 6,496,110, of Peterson et al, for RAPID FIRE EMERGENCY RESPONSE FOR MINIMIZING HUMAN CASUALTIES WITHIN A FACILITY, filed Dec. 6, 2000.

BACKGROUND OF THE INVENTION

The present invention relates generally to systems for evaluating and responding to emergencies threatening human life, such as hazardous chemical substance releases and chemical and biological agent releases at facilities, such as government buildings, public gathering places, or any area occupied by one or more persons. More specifically, but without limitation thereto, the present invention relates to monitoring a facility for the presence of hazardous chemical substances including chemical, biological, and explosive agents that may threaten human life within the facility. Even more specifically, the present invention relates to a computerized system that monitors the presence of hazardous chemical substances, structural damage, and a variety of other emergencies threatening human life within a facility and generates a response, such as an evacuation plan and control of resources and equipment within the facility including heating ventilation and air conditioning (HVAC) systems to minimize human casualties within the facility.

In addition to the threat to human life at facilities posed by accidental releases of hazardous chemical substances and biological agents, there has been an increase in apparently random and heinous terrorist attacks in public gathering places, such as government facilities and offices, large business facilities, hospitals, airports, train depots, subway stations, border crossings, and even aboard public carriers, such as airplanes, trains, subways, and ships.

While loss of human life within facilities such as described above as a result of accidental or intentional releases of hazardous chemical substances and biological agents is almost inevitable unless extreme precautionary measures are taken, such as wearing gas masks or bio-hazard suits, the number of human casualties due to injury and death may be dramatically affected by the type of response made against the release and the speed with which the response is carried out.

Disadvantageously, the complexity involved in analyzing what is an appropriate response to any given chemical or biological agent release depends on the location within the facility of the release, the state of the heating, ventilation, and air conditioning (HVAC) systems, weather conditions, temperatures inside the facility, time of day, concentrations of personnel, building conditions, and the type of chemical or biological agent employed. Unfortunately, in the panic of a terrorist attack, personnel in facilities are presently ill-equipped to cope with these complexities and the stresses inherent in such an attack. For example, an appropriate response might include operating an HVAC system to minimize the transport of hazardous substances from areas where they were released while ventilating other areas with as much fresh air as possible. At the same time, personnel may need to be routed through the facility to exits or safer areas.

While in some cases the prior art has provided crude automated responses for fires and intrusions, these automated responses have not adequately addressed the problem of analyzing different possible responses depending on the specific circumstances and selecting the response most likely to result in the minimum number of human casualties and property damage.

SUMMARY OF THE INVENTION

A method and apparatus are described for responding to an emergency at a facility by analyzing a plurality of threat conditions to determine possible responses to an emergency and selecting a response to the emergency for minimizing human casualties within the facility.

The present invention may be characterized in one embodiment as a system for responding to an emergency that threatens to cause human casualties within a facility, such as a hazardous chemical substance release, a chemical or biological agent attack, or an explosion. The system has a plurality of inputs for receiving signals indicative of threat conditions and an emergency response module coupled to the inputs for analyzing the threat conditions to determine whether an emergency exists and for generating a response to the emergency for minimizing human casualties within the facility.

In another embodiment, the present invention may be characterized as a method for responding to an emergency by receiving data characterizing threat conditions and facility conditions, evaluating a plurality of emergency scenarios, generating a response to each emergency scenario, and storing the responses for rapid recall.

In a further embodiment, the invention may be characterized as a method for responding to an emergency by detecting the emergency, determining incident specifics of the emergency from the detection, and rapidly implementing a previously stored response to the emergency as a function of the incident specifics.

BRIEF DESCRIPTION OF THE DRAWINGS

The features and advantages summarized above in addition to other aspects of the present invention will become more apparent from the description, presented in conjunction with the following drawings.

FIG. 11 is a graphical representation of a Sarin concentration history in a lobby of a 12-story building with both lobby and building heating ventilation and air conditioning (HVAC) systems operating for evaluating the embodiments of the emergency response system of FIGS. 1 and 10;

FIG. 12 is a graphical representation of a Sarin dose on various floors above the lobby of the building with both lobby and building HVAC systems operating applicable for evaluating the embodiments of the emergency response system of FIGS. 1 and 10;

Corresponding reference characters indicate corresponding components throughout the several views of the drawings.

DETAILED DESCRIPTION OF THE DRAWINGS

The following description is presented to disclose the currently known best mode for making and using the present invention. The scope of the invention is defined by the claims.

Figure 1:
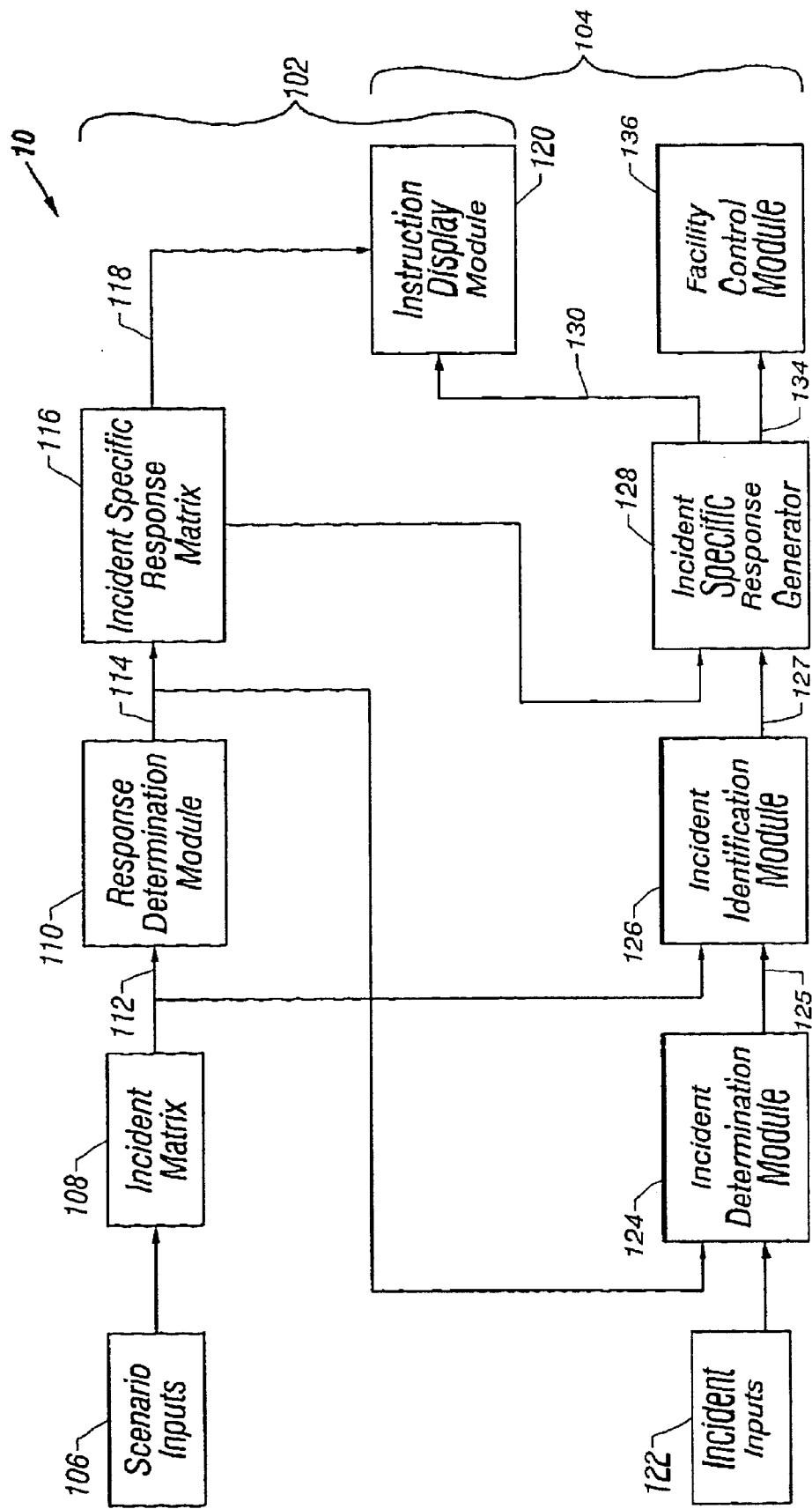
FIG. 1 is a block diagram illustrating components of an emergency response system according to an embodiment of the present invention.

FIG. 1 is a block diagram of an emergency response system 10 according to an embodiment of the present invention. The emergency response system 10 has two partitions, a scenario simulation partition 102 and an emergency response partition 104.

The scenario simulation partition 102 performs the steps of generating combinations of possible emergency scenario inputs before an emergency occurs, storing the combinations of scenario inputs that have a significant probability of representing an emergency, analyzing possible responses to each emergency scenario, selecting a response to minimize human casualties within a facility for each emergency scenario, and storing the response to each emergency scenario in a response matrix for rapid recall in a real emergency.

A facility is defined herein as any area or structure that may be occupied by one or more persons, such as vehicles, including vehicles used for public and private transportation, buildings, such as government buildings, public gathering places, office buildings, parking structures, factories, building complexes, such as sports complexes, geographical areas, such as parks, urban areas, and the like.

The scenario simulation partition 102 advantageously generates a matrix of intelligent emergency responses to virtually any emergency situation that may be analyzed from all the sources of information made available. The matrix of intelligent emergency responses may be immediately recalled in a real emergency without the processing time required for analyzing the input data to determine the optimum response.

The emergency response partition 104 receives as inputs threat conditions and facility operations, determines whether an incident is an emergency that threatens human life or may otherwise incapacitate personnel within the facility, identifies the incident, generates a specific response to the incident, displays instructions for carrying out the response to personnel within the facility, and controls facility equipment and resources to minimize human casualties within the facility.

The functions of the scenario simulation partition 102 and the emergency response partition 104 may be performed by either the emergency response system 10 of FIG. 1 according to one embodiment or in a method according to another embodiment by, for example, a computer concurrently performing the functions of the scenario simulation partition 102 and the emergency response partition 104.

The scenario simulation partition 102 includes scenario inputs 106 for inputting threat conditions, facility operations, and other data relevant to an emergency. The scenario inputs 106 are coupled to an incident matrix 108. The incident matrix 108 stores each combination of input conditions from the scenario inputs 106 and each possible state of each input condition to define likely combinations or scenarios of possible input states. A response determination module 110 receives as inputs scenarios 112 from the incident matrix 108, analyzes the scenarios, generates a matrix of response options for each scenario, and selects a response most appropriate to minimizing human casualties within the facility that might result for each scenario. The response determination module 110 outputs incident responses 114 to an incident specific response matrix 116. The incident specific response matrix 116 stores the incident responses 114 specific to each scenario and outputs appropriate instructions 118 for responding to each scenario to an instruction display module 120. The instruction display module 120 provides appropriate instructions to personnel at various locations within the facility in simple, well understood, and easily followed terms and is common to both the scenario simulation partition 102 and the emergency response partition 104.

The emergency response partition 104 includes incident inputs 122 for inputting threat conditions such as releases of chemical and biological agents, meteorological conditions, facility operations, and other data relevant to an emergency including human observations. The incident inputs 122 are coupled to the incident determination module 124. The incident determination module 124 determines whether the combination of inputs characterizing the incident constitutes an emergency, or, for example, a false alarm. If an emergency is determined, the data characterizing the emergency are forwarded to the incident identification module 126. The incident identification module 126 inputs the data characterizing the emergency from the incident determination module 124 and identifies the specific emergency at hand from scenarios 112 stored in the incident matrix 108. An incident specific response generator 128 inputs incident identification data 127 from the incident identification module 126 and selects an emergency response from the responses stored in the incident specific response matrix 116. The incident specific response generator 128 outputs emergency instructions 130 to the instruction display module 120 and control signals 134 to a facility control module 136 corresponding to the emergency response.

FIGS. 2–9 are functional block diagrams describing in further detail the components of the emergency response system 10 of FIG. 1 and steps traversed thereby during its operation.

Figure 2:
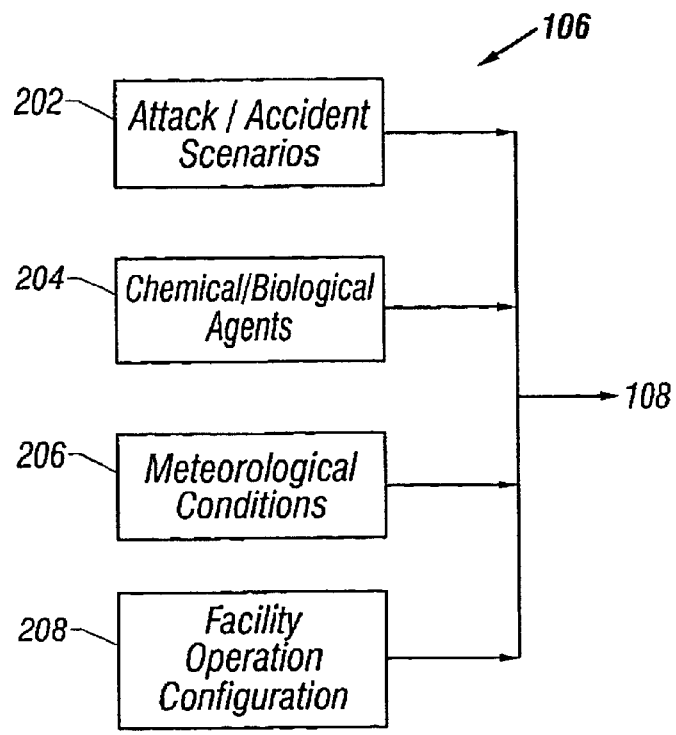
FIG. 2 is a functional block diagram of one variation of scenario inputs, such as may be used in the emergency response system of FIG. 1.

FIG. 2 is a detailed block diagram of the scenario inputs 106 of FIG. 1. An exemplary set of threat conditions and facility operations, collectively scenario inputs 106, is shown as attack/accident scenarios 202, chemical/biological agents 204, meteorological conditions 206, and facility operations 208.

The attack/accident scenarios 202 report the location, sequence, and timing of attacks, accidents, explosive releases, or other threats.

The chemical/biological agents 204 catalog a variety of chemical and biological substances that may threaten human life and provide corresponding data needed for calculating contaminant concentrations in various areas of the facility as a function of time and facility conditions.

The meteorological conditions 206 report the weather, temperature, humidity, wind speed and direction, and other external environmental conditions.

The facility operations 208 report internal environmental conditions such as temperature and humidity, ventilation system states (e.g., ducts open or closed, heating or cooling, return dampers open or closed, fresh air mixture, fans on or off), personnel locations and concentrations, elevator locations, windows open, closed, or broken, doors open or closed and locked or unlocked, and the like.

Combinations of conditions that are too unlikely to be considered a significant risk may be excluded from the incident matrix 108 to reduce the amount of data storage required. For example, a scenario having an outside temperature of 100° F. with all heating systems operating at maximum capacity and all windows closed might be excluded from the incident matrix 108 as being too unlikely to require a response.

Figure 3:
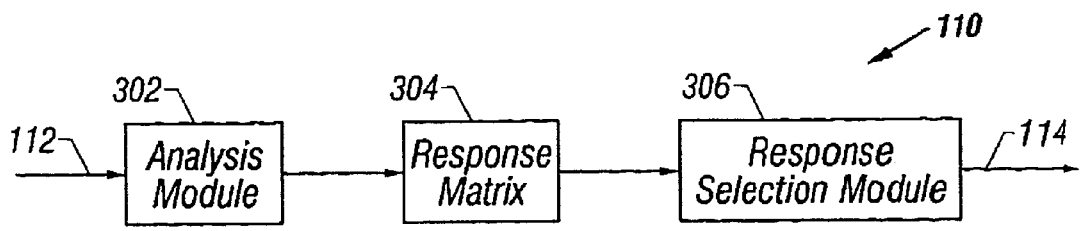
FIG. 3 is a functional block diagram of one variation of a response determination module, such as may be used in the emergency response system of FIG. 1.

FIG. 3 is a functional block diagram of the response determination module 110 in FIG. 1. The response determination module 110 has an analysis module 302 that analyzes scenarios 112 and generates a response matrix 304 of possible responses to each scenario. The response matrix 304 outputs the possible responses to a response selection module 306. The response selection module 306 selects the response most likely to result in a minimum of human casualties for the specific scenario input conditions provided as determined by the scenario inputs 106. For example, in the attack scenario illustrated in FIG. 11, a liter of Sarin is released in the lobby of a 12-story building over a five minute period. A response matrix 304 for such an attack may include the following three responses: (1) continued operation of the lobby and main building HVAC systems, (2) shutting down the lobby and main building HVAC systems, and (3) shutting down the lobby HVAC system, closing the return dampers on floors 2–12, and continued normal operation of the main building HVAC system. Results of analyses of these possible responses provide the casualty data shown in FIG. 16. The response selection module 306 selects response (3) for this scenario based on analysis criteria described below. Response (3) is then included in the incident specific response matrix 116 and the incident response generator 128.

Figure 4:
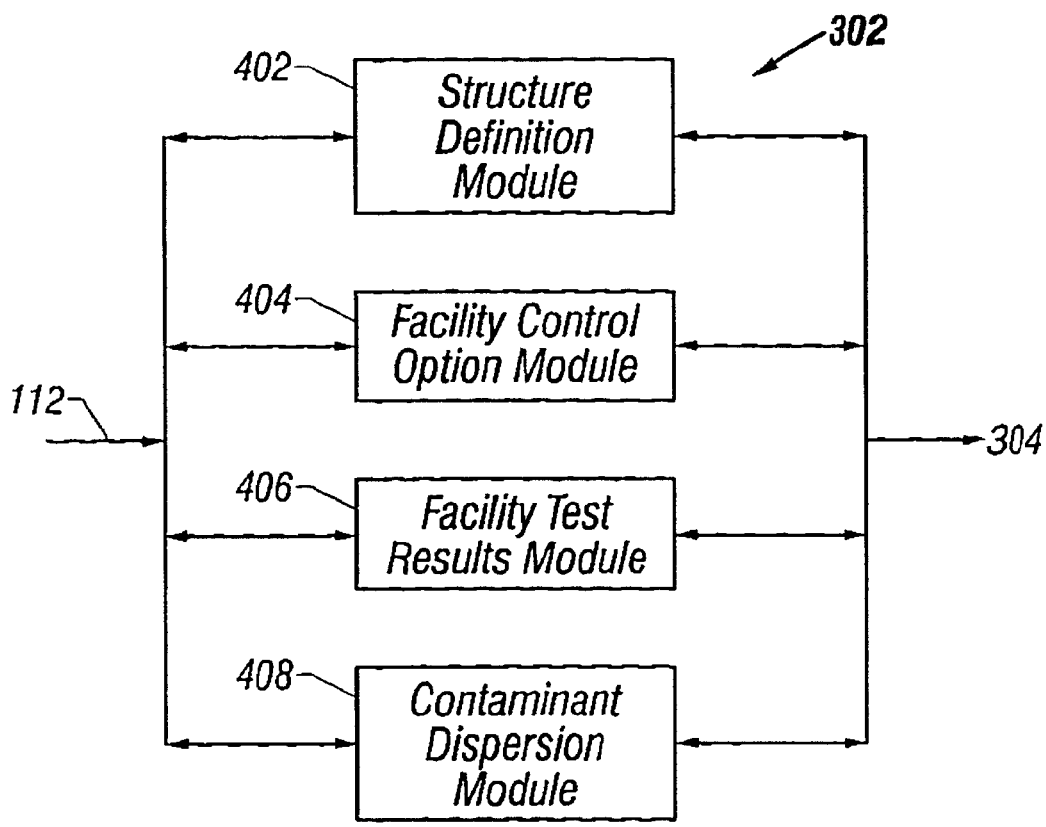
FIG. 4 is a functional block diagram of an analysis module, such as may be used in the emergency response system of FIG. 3.

FIG. 4 is a functional block diagram of the analysis module 302 of FIG. 3. The analysis module 302 includes a structure definition module 402, a facility control options module 404, a facility test results module 406, and contaminant dispersion models 408.

The structure definition module 402 defines the structural details such as floor plans, number of floors, points of air leakage, and location of exits.

The facility control component 404 defines the ways in which the facility may be configured, such as heating, ventilation, and air conditioning (HVAC) on or off, return and other dampers open or shut, fresh air mixture, and air flow rate.

The facility test results module 406 defines locations and flow rates of air leakage within the facility for windows, doors, shafts, and other facility penetrations and openings.

The contaminant dispersion models 408 model internal and external contaminant dispersion for a variety of toxic airborne contaminants. The application of internal and external contaminant dispersion models to a facility emergency response system is an important feature of the present embodiment and will be discussed later in further detail. Referring again to FIG. 3, analysis module 302 generates a matrix of possible responses 304 to the response selection module 306.

Figure 5:
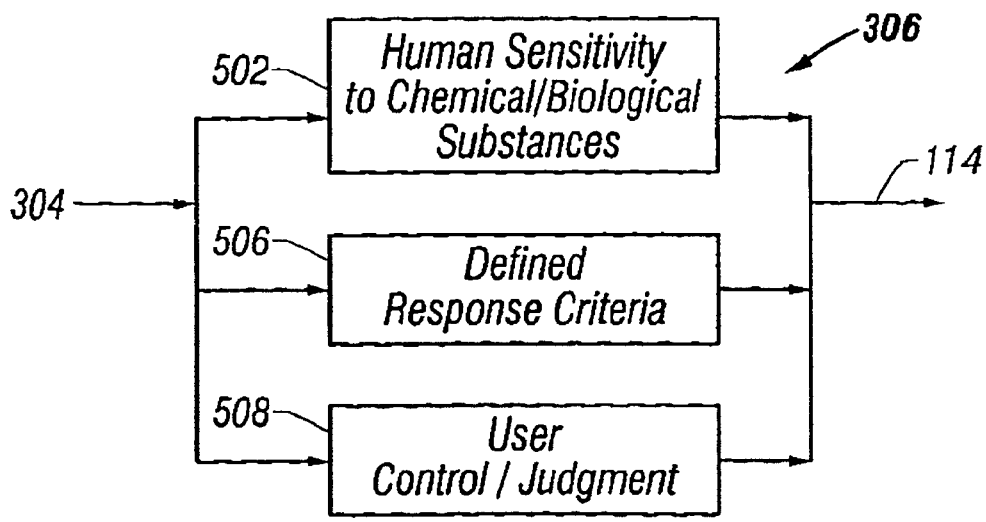
FIG. 5 is a functional block diagram of a response selection module, such as may be used in the emergency response system of FIG. 3.

FIG. 5 is a functional block diagram of the response selection module 306. The response selection module 306 compares each possible response from the possible response matrix 304 to criteria defining human sensitivity to chemical/biological agents 502 and other defined response criteria 506, such as preferential protection requirements that may be established for certain parts of a facility, for example, where the highest concentration of personnel are located. Based on the criteria defining human sensitivity to chemical/biological agents 502 and the other defined response criteria 506, the response selection module 306 selects the response most likely to minimize human casualties within the facility. The response selection module 306 also inputs user control/judgment 508 as a possible override option to change the selected response 114. The incident specific response matrix 116 stores each selected scenario response 114 and outputs a corresponding instruction command 118 to the instruction display module 120.

Figure 6:
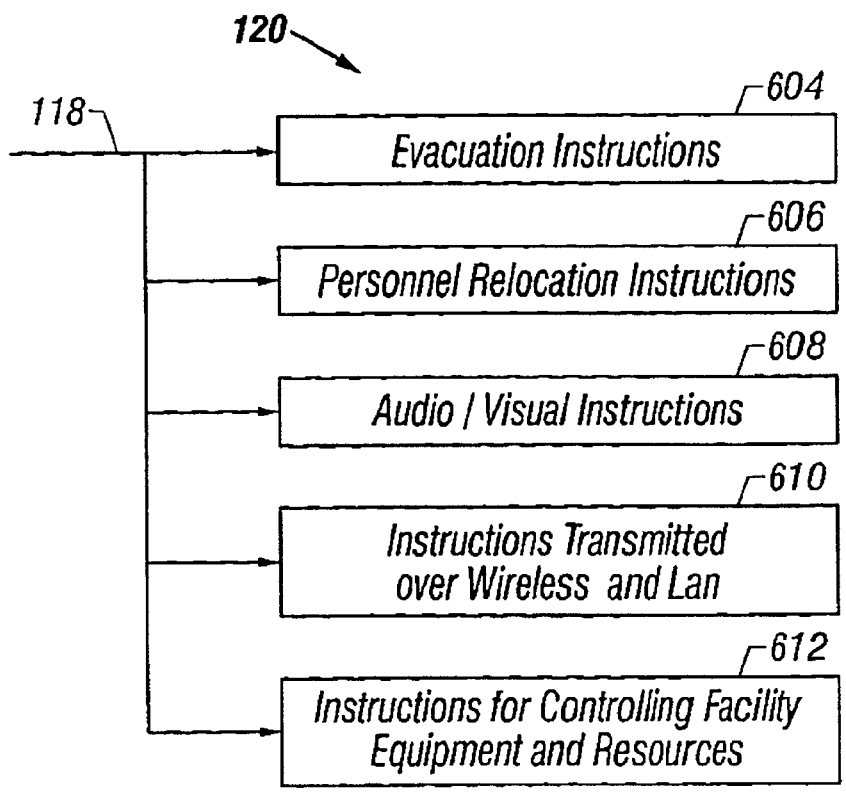
FIG. 6 is a functional block diagram of an instruction display module, such as may be used in the emergency response system of FIG. 1.

FIG. 6 is a detailed block diagram of the instruction display module 120. The instruction display module 120 outputs a set of emergency instructions for display for each emergency command 118 in simple, easily understood terms. An exemplary set of instruction displays is shown as evacuation instructions 604, personnel relocation instructions 606, audio/visual instructions 608, instructions transmitted over wireless and local area networks (LAN) 610, and instructions for controlling facility equipment and resources 612. For example, pre-recorded instructions for evacuation may be announced over a public address system, and exit displays may be automatically illuminated to highlight a specific evacuation route or to warn against using an evacuation route that has become dangerous. Facility personnel may follow announced and displayed instructions to operate facility equipment such as HVAC in a timely and safe manner to minimize human casualties. Instructions may also be transmitted to remote locations by, for example, cellular telephones, pagers, and personal digital assistants (PDAs).

Figure 7:
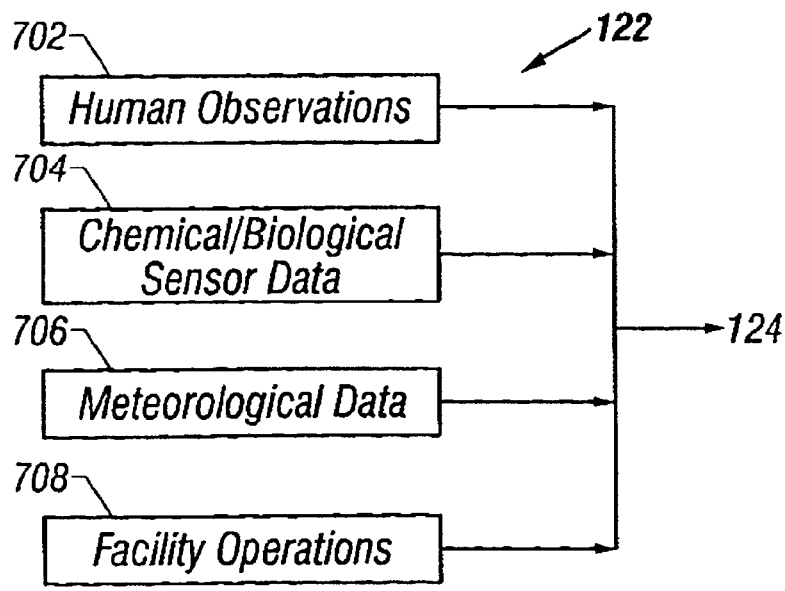
FIG. 7 is a functional block diagram of one variation of incident inputs, such as may be used in the emergency response system of FIG. 1.

FIG. 7 is a detailed block diagram of the incident inputs 122 of FIG. 1. An exemplary set of threat conditions and facility conditions shown as human observations 702, chemical/biological agent sensor data 704, meteorological data 706, and facility operations data 708 is received as input to the incident determination module 124.

Human observations 702 report the location, sequence, and timing of attacks, accidents, and other threats by, for example, an alarm panel. If desired, responses may be triggered by human observations alone without the use of chemical and biological agent sensors.

The chemical/biological sensor data 704 report a variety of chemical and biological substances that could incapacitate personnel and threaten human life.

The meteorological data 706 report the weather, temperature, humidity, wind speed and direction, and other external environmental conditions.

The facility operations data 708 report internal environmental conditions such as temperature and humidity, HVAC system states (e.g., ducts open or closed; heating, cooling, or off; damper returns open or closed; fresh air mixture ratio; fans on or off), personnel locations and concentrations, elevator locations, doors open or closed and locked or unlocked, and the like. The facility operations data 708 also include other conditions such as intrusion alarms, location and number of occupants, building damage, and other building structural condition data.

The incident determination module 124 receives as input the incident inputs 122 and the selected scenario responses 114 and checks whether the incident inputs 122 indicate an emergency that may incapacitate personnel or threaten human life. This step avoids undue reaction to false alarms. If the incident inputs 122 indicate an emergency, then emergency identification information 125 is output to the incident identification module 126.

Figure 8:
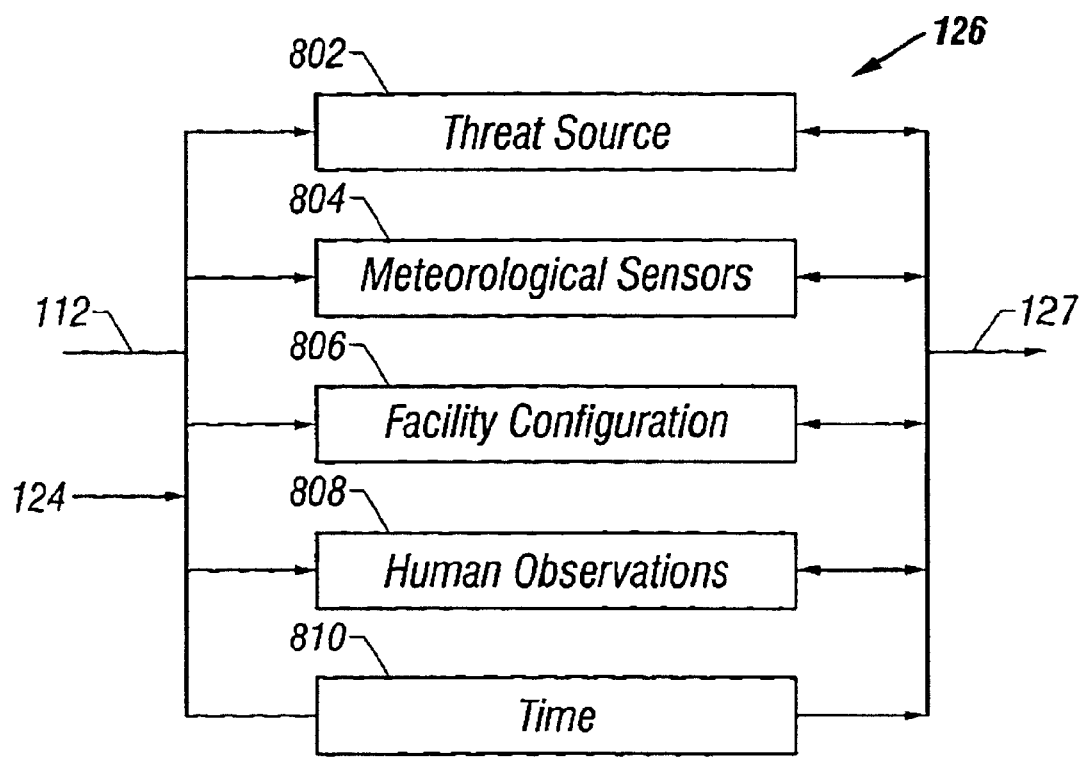
FIG. 8 is a functional block diagram of one variation of an,incident identification module, such as may be used in the emergency response system of FIG. 1.

FIG. 8 is a detailed block diagram of the incident identification module 126 of FIG. 1. The incident identification module 126 has a threat source component 802, a meteorology component 804, a facility configuration component 806, a human observations component 808, and a time component 810.

The threat source component 802 considers threat source data 125 from the incident determination module 124 in the context of weather conditions received as input from the meteorology component 804, facility configuration information received as input from the facility configuration component 806, eyewitness reports received as input from the human observations component 808, and the time of the incident received as input from the time component 810. The incident identification module 126 maps the scenario 112 from the incident matrix 108 to identify the emergency and outputs specific incident data 127 to the incident specific response generator 128.

Figure 9:
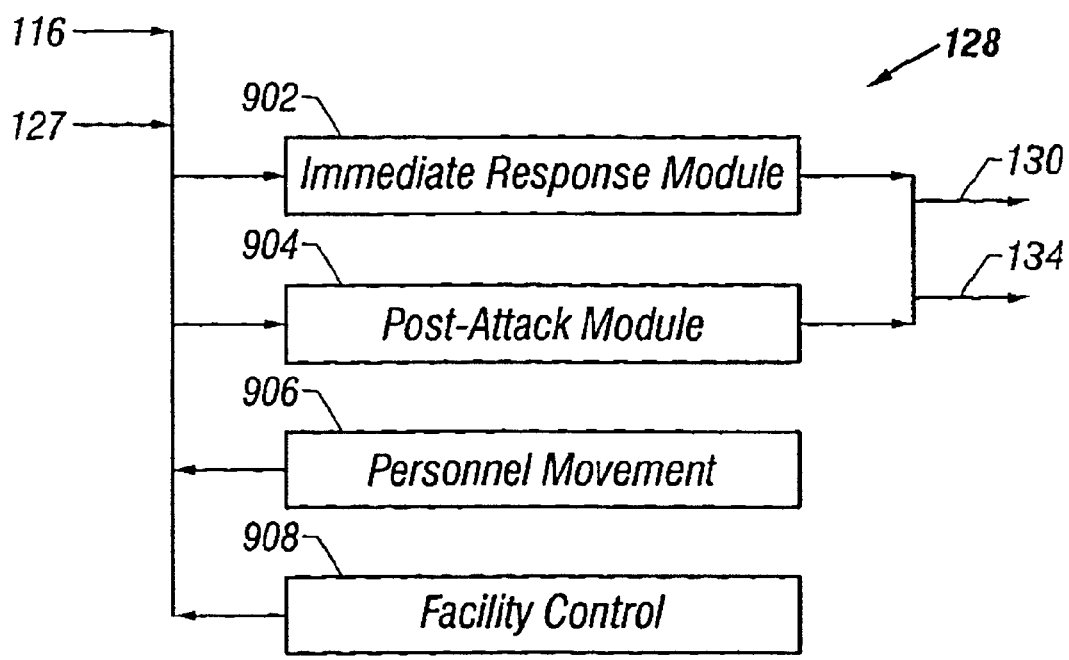
FIG. 9 is a functional block diagram of one variation of an incident specific response generator, such as may be used in the emergency response system of FIG. 1.

FIG. 9 is a detailed block diagram of the incident specific response generator 128 in FIG. 1. The incident specific response generator 128 includes an immediate response module 902 and a post attack module 904. The immediate response module 902 and the post attack module 904 each input data from a personnel movement component 906 and a facility control component 908.

The incident specific response generator 128 receives as inputs specific incident data 127 from the incident identification module 126 and generates as output emergency instructions 130 to the instruction display module 120 and control signals 134 to the facility control module 136.

The immediate response module 902 selects an emergency response from the incident specific response matrix 116 that corresponds to the specific incident data 127 and outputs instructions for immediate action to the instruction display module 120 and to the facility control module 136 in FIG. 1 according to the instructions input from the personnel movement component 906 and the facility control component 908.

The post attack module 904 outputs instructions for follow-up action after the emergency to the instruction display module 120 and to the facility control module 136 in FIG. 1 according to the instructions input from the personnel movement component 906 and the facility control component 908.

The personnel movement component 906 contains instructions for routing personnel located within the facility to safety for both the immediate response module 902 and the post attack module 904.

The facility control component 908 contains instructions for operating facility equipment and resources for both the immediate response module 902 and the post attack module 904.

Figure 10:
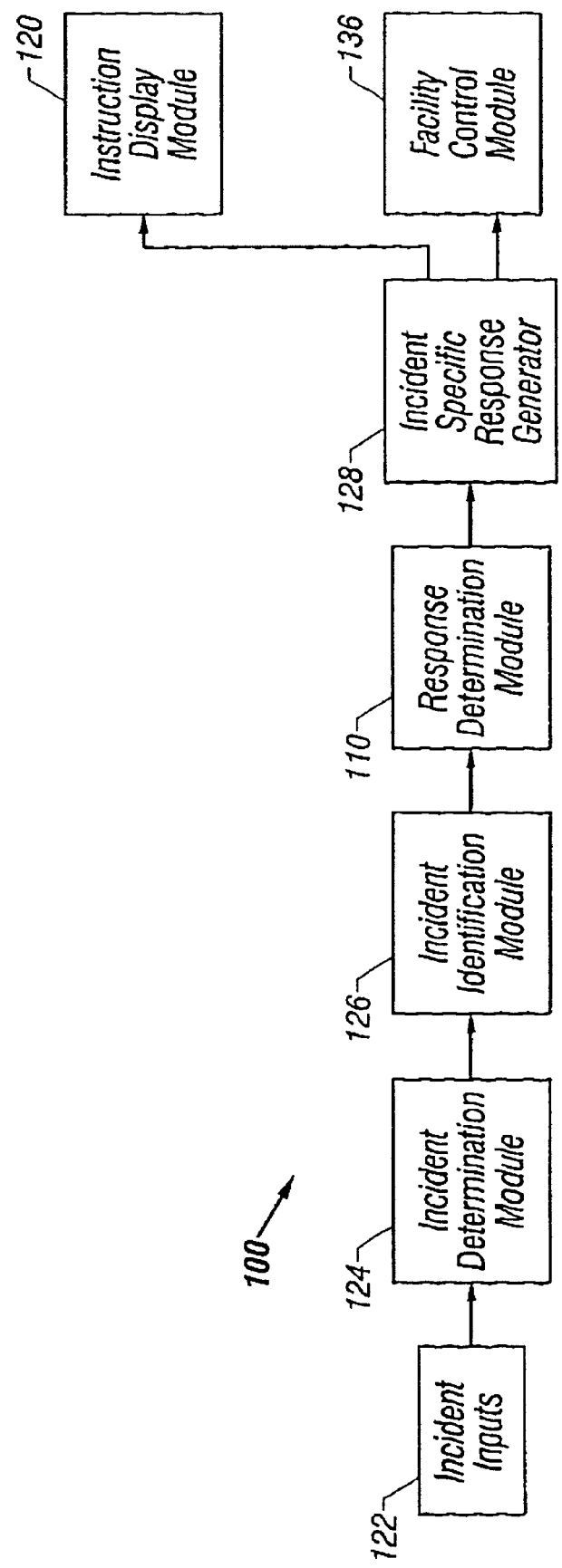
FIG. 10 is a block diagram illustrating an alternative arrangement of components for an integrated emergency response system according to an another embodiment of the present invention.

FIG. 10 is a block diagram of an integrated emergency response system 100 according to an alternative embodiment. The integrated emergency response system 100 is similar to the emergency response section 104 in FIG. 1 with the exception that the response determination module 110 is included between the incident identification module 126 and the incident specific response generator 128. The integrated emergency response system 100 provides the capability of analyzing and responding to an emergency without the requirement of generating and storing a full range of predetermined scenarios. Although greater computer power is needed to analyze scenarios in real time, the system cost may be substantially reduced.

The application of internal and external contaminant dispersion models to the analysis of a facility emergency in the discussion of FIG. 4 above may be implemented as follows. An important requirement of this embodiment that includes modeling contaminant dispersion is the proper setting of boundary conditions. The boundary conditions include external contaminant transport modeling (for external contaminant sources) from the source to the facility and accurate descriptions for the specific facility of leakage and flow through window frames, structure joints and electrical and plumbing chases, exterior envelope quality, tightness of elevator shafts and stairwells, HVAC configuration and the like. Such modeling techniques have been documented and may be implemented by one of ordinary skill in the art. See, for example, Grot, R. A. *User Manual NBSAVIS CONTAM88, A User Interface for Air Movement and Contaminant Dispersal Analysis in Multizone Buildinqs, NISTIR 4585*, National Institute of Standards and Technology (NIST); and Kurabuchi, T., J. B. Fang and R. A. Grot (1990), *A Numerical Method for Calculating Indoor Air Flows Using a Turbulence Model*, NISTIR 89-4211.

In accordance with the embodiment of the contaminant dispersion module 408 in FIG. 4, two state of the art airflow and contaminant dispersal programs are used to model migration of chemical and biological agents through a facility, based on the exemplary boundary conditions set forth above. These programs can simulate multiple contaminant sources, multiple contaminants, aerosols, and particulates including smoke.

A first set of programs, IAQFLOW/CONTFLOW, are multiple zone models that model airflow and contaminant migration in multi-compartment buildings. These programs are owned by Lagus Applied Technology, Inc. of San Diego, Calif., and are hereby incorporated by reference.

A second set of programs is a series of computational fluid dynamic (CFD) models, EXFLOW and EXCONT. These programs are owned by Lagus Applied Technology, Inc. of San Diego, Calif., and are hereby incorporated by reference.

The program IAQFLOW is a building description processor that allows a natural description of the building, its HVAC system, contaminant sources, and all the above-mentioned boundary conditions to be input from data generated by a study and testing of the facility. The program IAQFLOW processes building description data and produces non-linear network data required to solve multi-zone flow and contaminant migration equations in the CONTFLOW program.

These programs have been used to model airflow and contaminant migration of buildings of up to fifty-two stories. IAQFLOW and CONTFLOW were developed by Dr. Grot at Lagus Applied Technologies, Inc. (LAT) and are advanced versions of CONTAM/AIRMOV programs developed and tested at the National Institute of Standards and Technology (NIST) under the direction of Dr. Grot. These models are widely used and understood by those skilled in the field of contaminant flow modeling.

Computational Fluid Dynamics programs EXFLOW and EXCONT model details of air movement and contaminant dispersal inside building spaces, for example, airport terminal check-in areas, atriums, chemical laboratories, etc. Both natural and HVAC induced temperature and pressure differences drive air and contaminant motions and are considered by EXFLOW and EXCONT. EXFLOW and EXCONT were developed by Dr. Grot and are advanced versions of the Computational Fluid Dynamics programs EXACT 3 and CONTAM 3 developed at the National Institute of Standards and Technology and the University of Tokyo, and are widely used by building researchers.

Many applications require coupling of the zonal models with the Computational Fluid Dynamics models and the test data. The Computational Fluid Dynamics model is used to describe semi-open spaces within facilities while ventilation to these spaces are described with the zonal model.

Test data are used to determine facility leakage and facility ventilation characteristics that are input to the models.

Typical IAQFLOW and CONTFLOW results for a Sarin attack are illustrated in FIGS. 11, 12, 13 and 14. These figures are representative of a release of 1 liter of Sarin in a hypothetical 12-story building with separate HVAC systems for the lobby and the remaining 11 stories of the building.

Figures 11, 12:
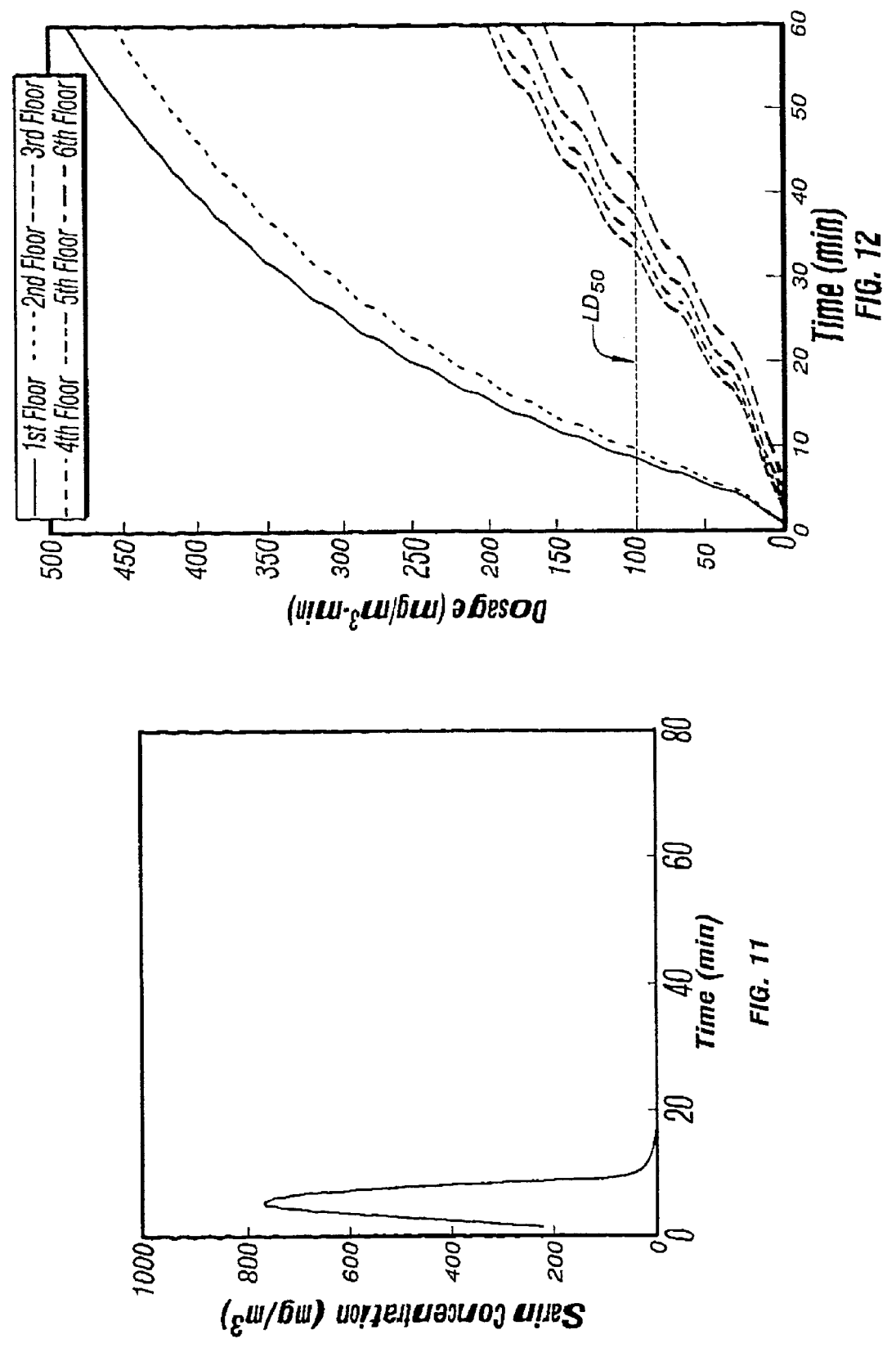

FIG. 11 is a graphical representation of a Sarin concentration history in a lobby of a building with both lobby and building heating, ventilation and air conditioning (HVAC) systems operating.

FIG. 12 is a graphical representation of a Sarin dose on various floors above the lobby of the building with both lobby and building HVAC systems operating.

Figure 13:
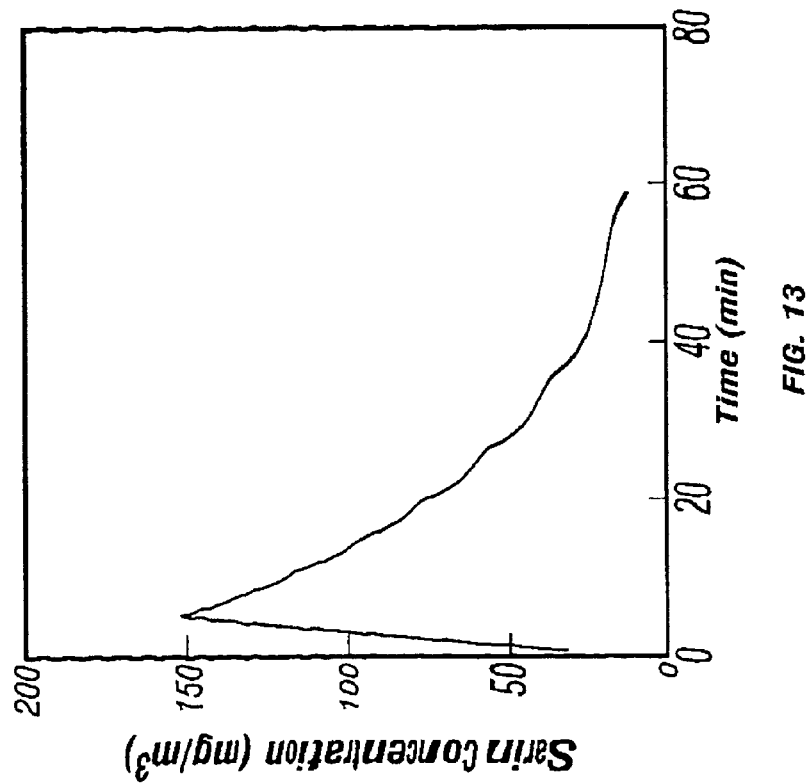
FIG. 13 is a graphical representation of a Sarin concentration history in the lobby with lobby HVAC system off, return dampers closed on floors 2–12, and the building HVAC system operating for evaluating the embodiments of the emergency response system of FIGS. 1 and 10.

FIG. 13 is graphical representation of a Sarin concentration history in the lobby with lobby HVAC system off, return dampers closed on floors 2–12, and the building HVAC system operating with return dampers closed to pressurize the remainder of the building.

Figure 14:
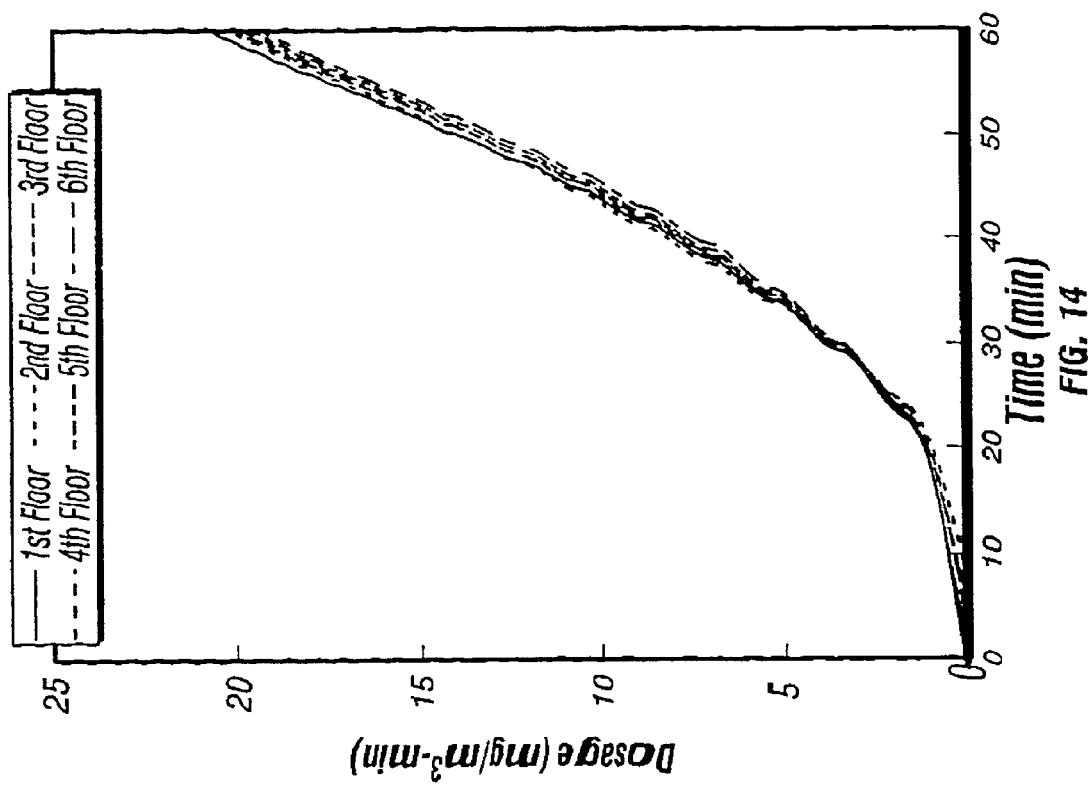
FIG. 14 is a graph illustrating a Sarin dose on various floors above the lobby with both lobby HVAC system off, return dampers closed on floors 2–12, and building HVAC system operating for evaluating the embodiments of the emergency response system of FIGS. 1 and 10.

FIG. 14 is a graph illustrating a Sarin dose on various floors above the lobby with the lobby HVAC system off, return dampers closed on floors 2–12, and the building HVAC system operating with return dampers closed to pressurize the remainder of the building.

Exterior contaminant flow may be modeled, for example, using a program such as PC-SCIPUFF. This program is available from the Defense Threat Reduction Agency (DTRA) and is widely used and understood by experts in the field of plume modeling.

Contaminant dispersion data determined by the PC-SCIPUFF program for external incidents are used as an input to interior IAQFLOW and CONTFLOW and EXFLOW/EXCONT flow models. PC-SCIPUFF uses data describing releases from structures to determine downstream hazards. By including downstream hazards in the response analysis, emergency responses may be developed not only for the subject facility, but also for adjacent or nearby facilities. In this way emergency responses may be extended from individual buildings to complexes and coordinated to minimize overall casualties, for example, in a campus of buildings.

Figure 15:
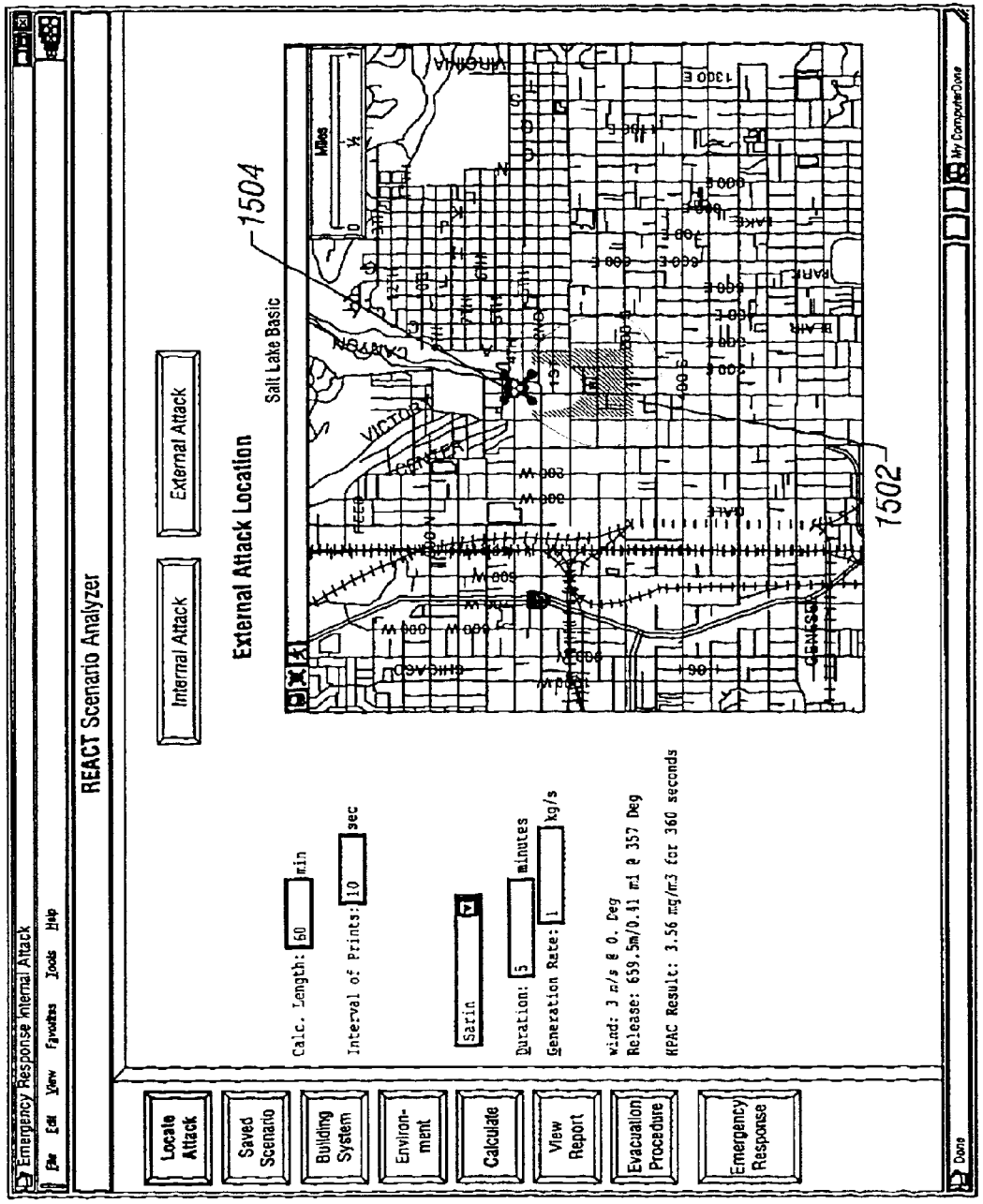
FIG. 15 is an exemplary SCIPUFF plume calculation for a source contaminant release for evaluating the embodiments of the emergency response system of FIGS. 1 and 10.

A typical example of a PC-SCIPUFF analysis is shown in FIG. 15. FIG. 15 illustrates an exemplary SCIPUFF plume pattern 1502 calculated for a contaminant released from a source 1504. SCIPUFF (second-order closure integrated puff), is selected as an example due to its acceptance as a Department of Defense atmosphere transport model, and is under continued development by DTRA. SCIPUFF (of which PC-SCIPUFF is a specific implementation) is an advanced Lagrangian Gaussian puff model that describes atmospheric transport and dispersion of vapor, aerosol, and specific contaminants. It considers turbulence, boundary layer and terrain effects, meteorological coupling, and atmospheric chemistry. SCIPUFF uses second order turbulence closure techniques to rapidly compute measurable turbulent velocity statistics. Additionally, a closure model provides a prediction of the statistical variance in the concentration field, which can be used to estimate uncertainty in dispersion prediction resulting from inherent uncertainty in wind fields.

Figure 16:
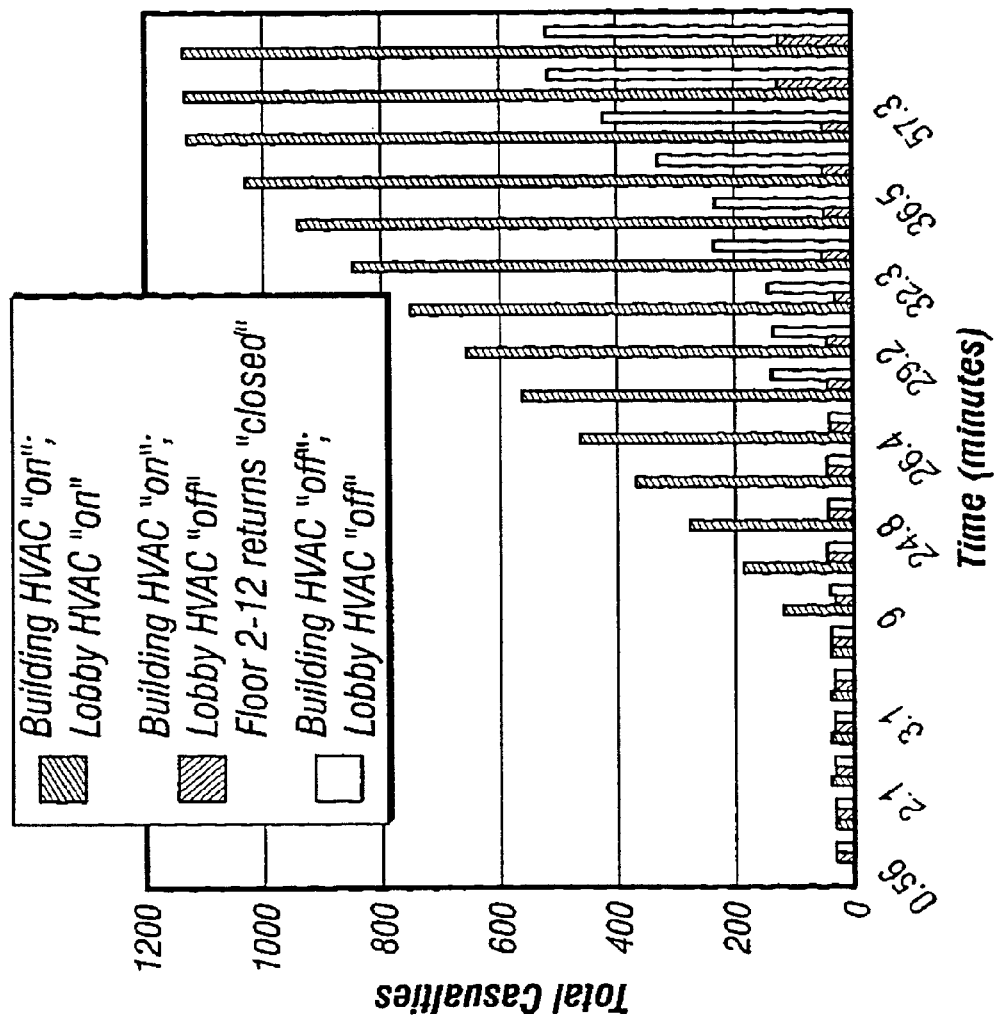
FIG. 16 is a graph illustrating casualties resulting from a simulated Sarin attack on a facility as a function of time and an exemplary reduction in casualties resulting from employing the embodiments of the emergency response system of FIGS. 1 and 10.

FIG. 16 is a graph illustrating casualties resulting from a simulated Sarin attack on a facility as a function of time and an exemplary reduction in casualties resulting from employing the emergency response system embodiments of FIGS. 1 and 10. In the first few minutes of the attack, the casualties are about the same regardless of the state of the HVAC system. However, by controlling the HVAC system to switch off ventilation in the lobby and to pressurize the rest of the building, casualties may be reduced tenfold.

Figure 17:
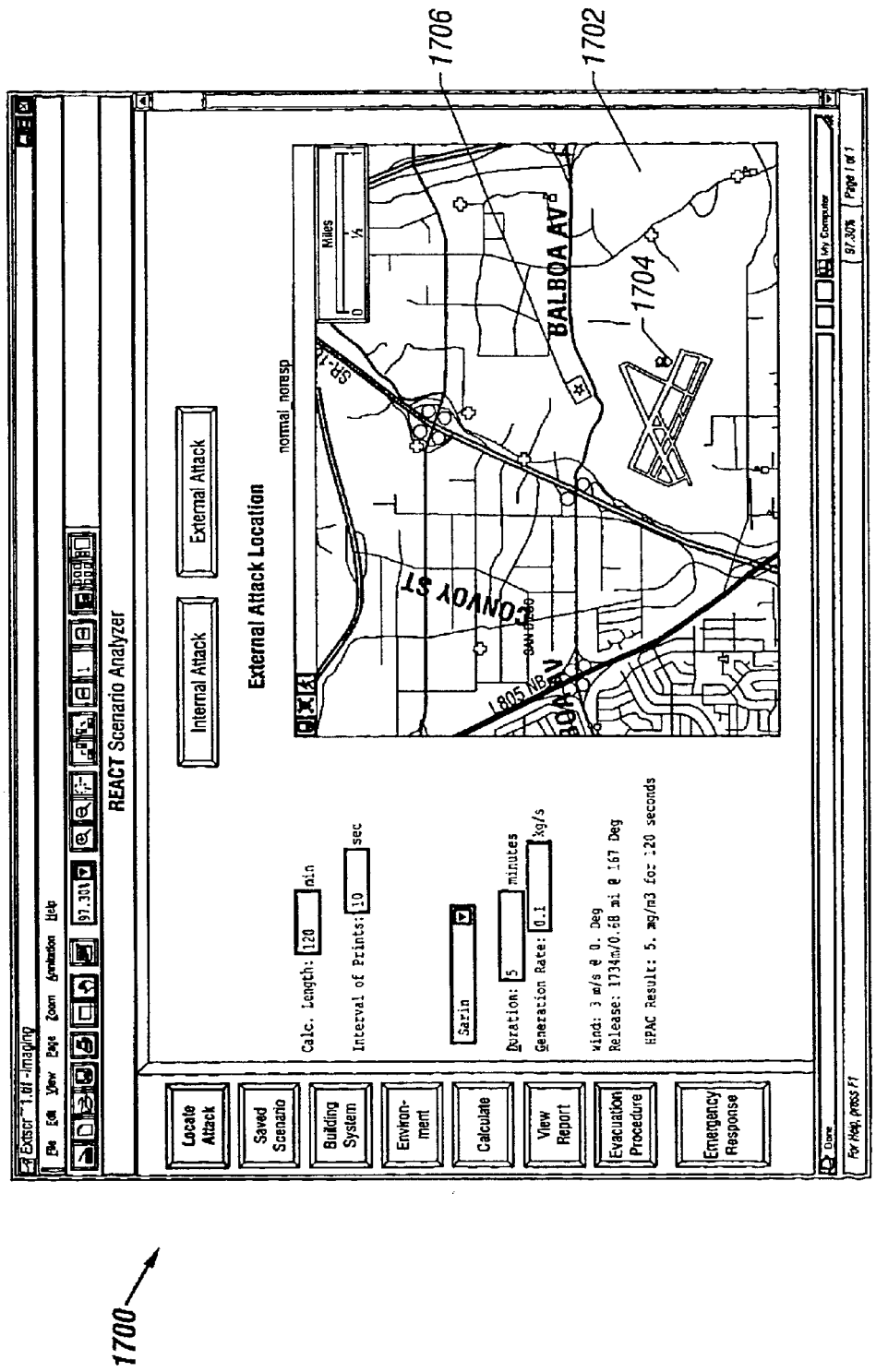
FIG. 17 is a computer display generated by the response determination module of FIG. 1 for analyzing an emergency scenario.

FIG. 17 is a computer display 1700 generated by the response determination module 110 of FIG. 1 for analyzing an emergency scenario. In this example, an area map 1702 shows the location of a barrel of Sarin 1704 released a distance away from a building 1706.

Figure 18:
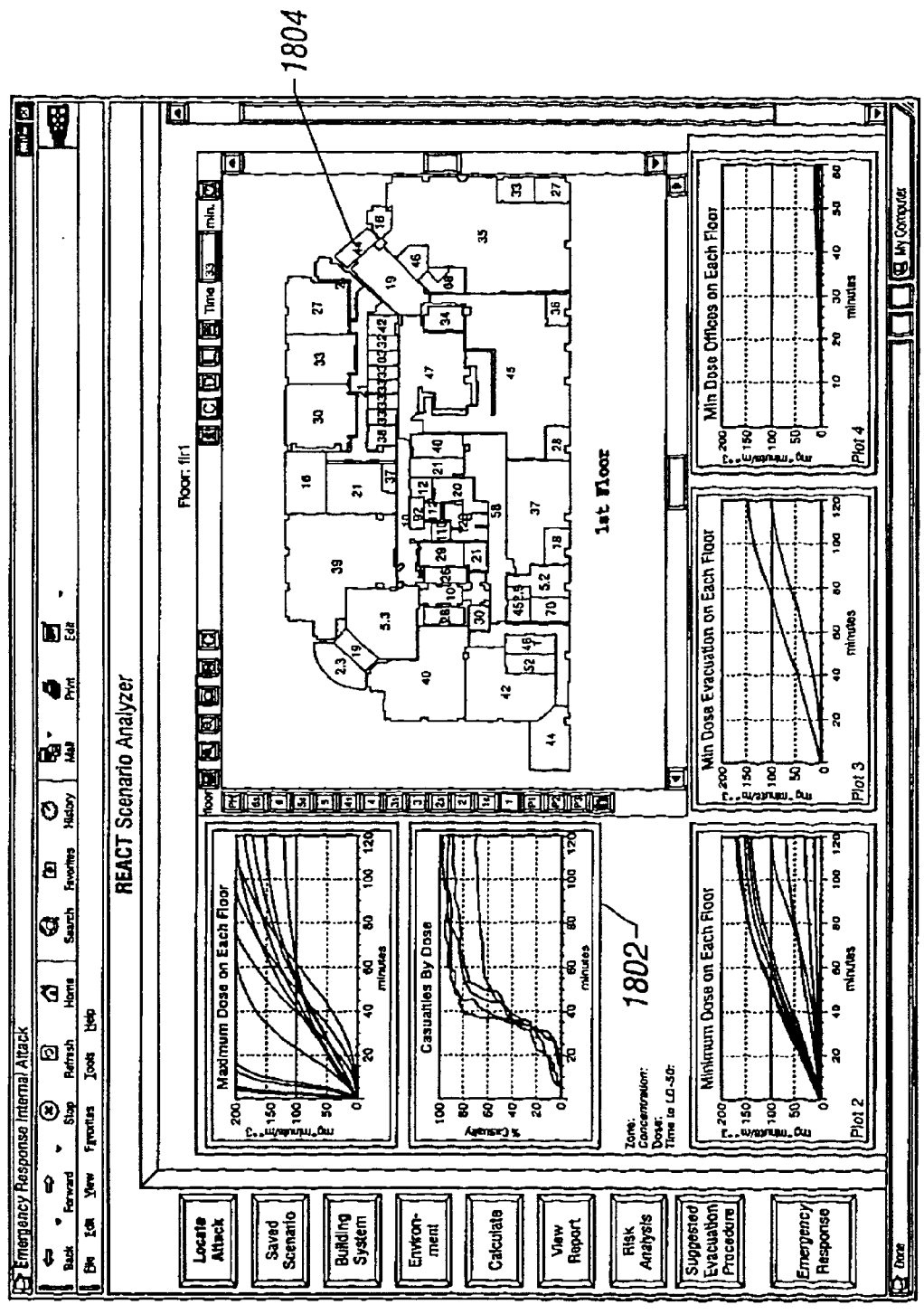
FIG. 18 is a computer display generated by the response determination module displaying a chart of predicted casualties and an area plot showing the Sarin contamination spreading throughout the building for the emergency scenario identified in FIG. 17 if no emergency response is implemented.

FIG. 18 is a computer display 1800 generated by the response determination module 110 displaying a chart of predicted casualties 1802 and an area plot 1804 showing the Sarin contamination spreading throughout the building for the emergency scenario identified in FIG. 17 if no emergency response is implemented.

Figure 19:
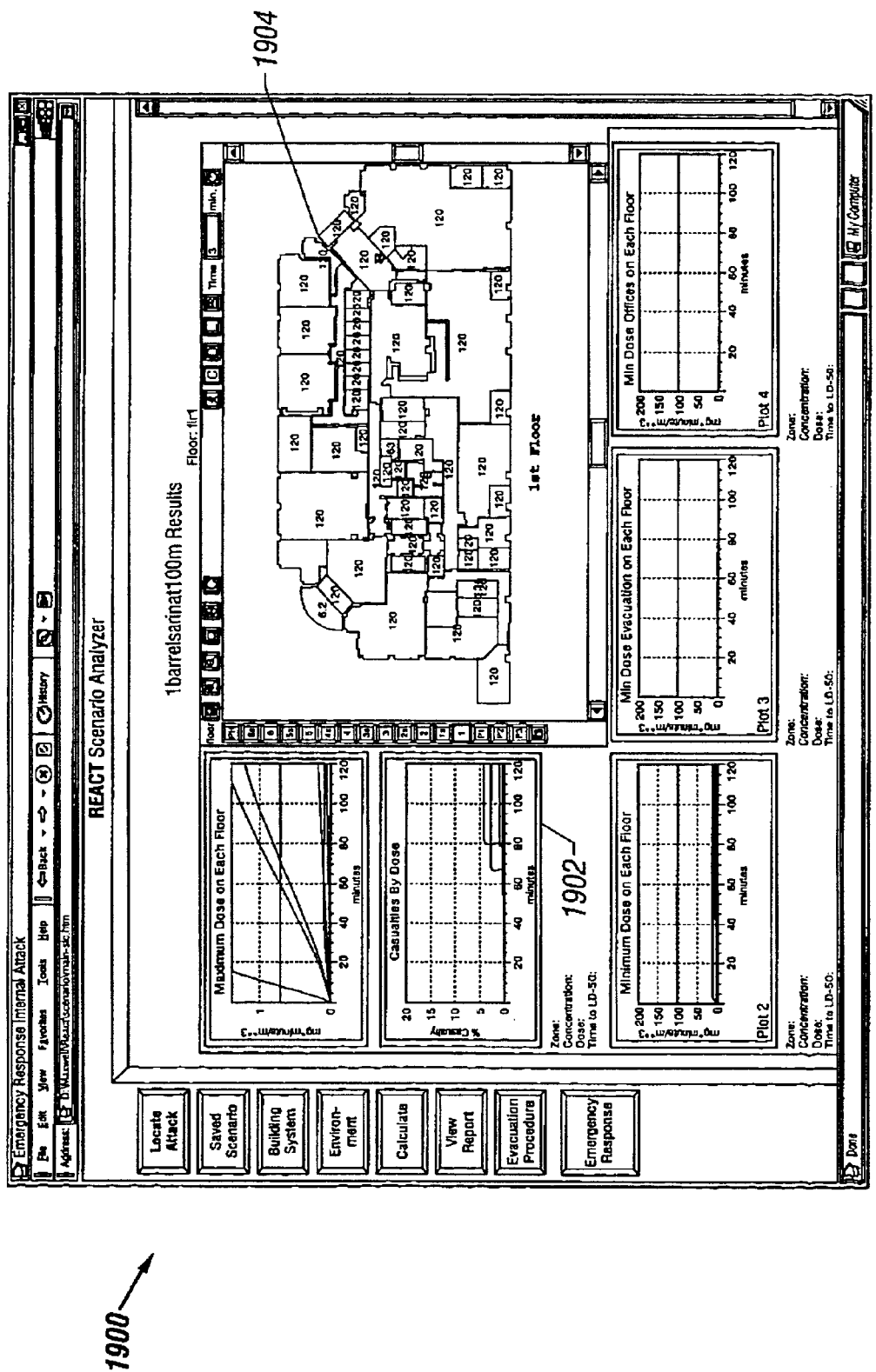
FIG. 19 is a computer display generated by the response determination module displaying a chart of predicted casualties and an area plot of Sarin contamination throughout the building for the emergency scenario of FIG. 17 if implementing a selected emergency response generated by the response determination module is carried out before the Sarin reaches the building.

FIG. 19 is a computer display 1900 generated by the response determination module 110 displaying a chart of predicted casualties 1902 and an area plot 1904 of Sarin contamination throughout the building for the emergency scenario of FIG. 17 if implementing a selected emergency response generated by the response determination module 110 of shutting down all HVAC systems in the building is carried out before the Sarin reaches the building.

Figure 20:
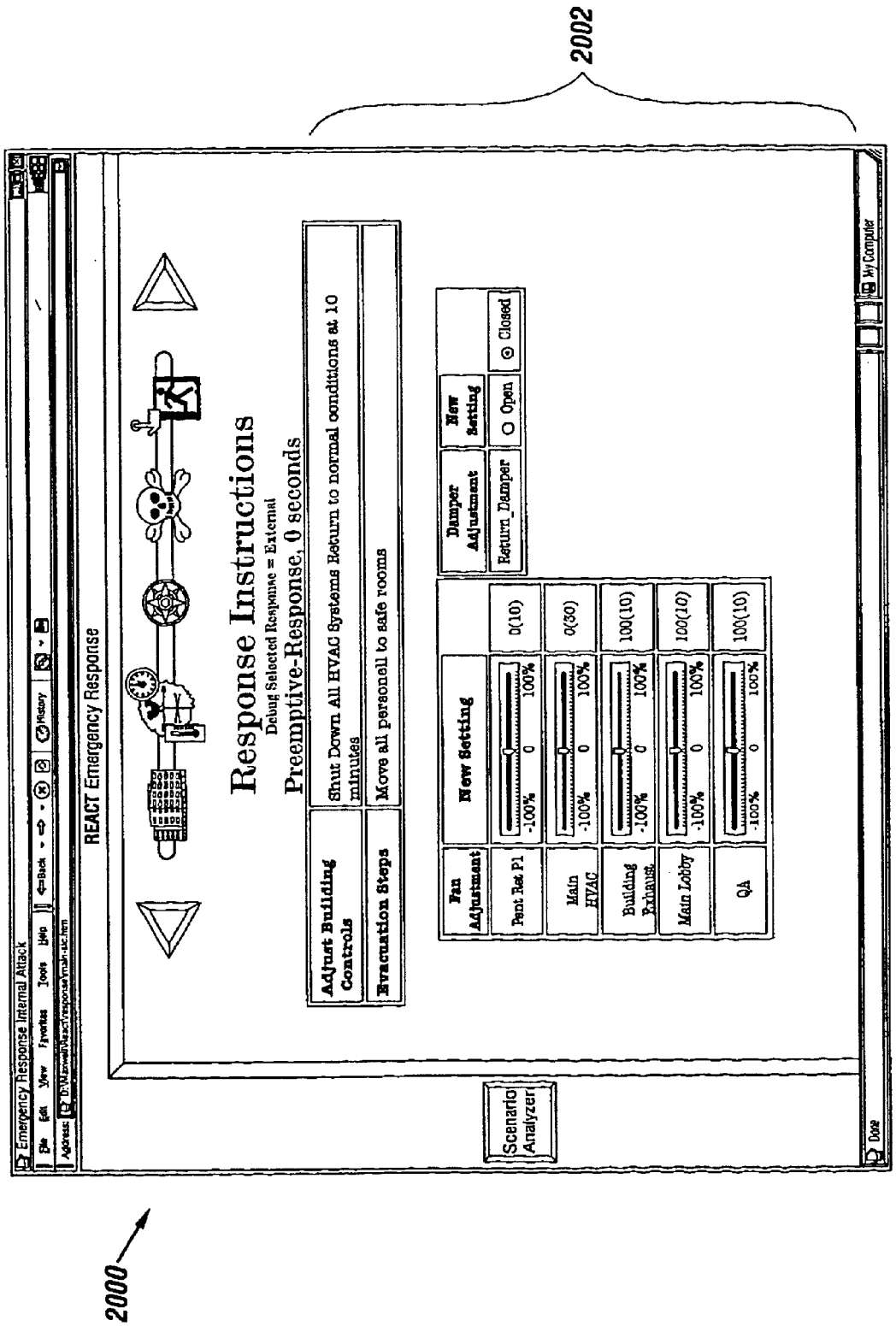
FIG. 20 is a computer display generated by the instruction display module and the facility control module displaying instructions for executing the emergency response of FIG. 19 within seconds after the identification of the Sarin release.

FIG. 20 is a computer display 2000 generated by the instruction display module 120 and the facility control module 136 displaying instructions 2002 for executing the emergency response of FIG. 19 within seconds after the identification of the Sarin release. As may be appreciated from a comparison of FIGS. 18 and 19, the number of casualties and the spreading of Sarin contamination is substantially reduced by implementing the selected emergency response generated by the response determination module 110. Instructions for relocating personnel and operating building equipment are displayed by the instruction display module 120 and the facility control module 136.

Figure 21:
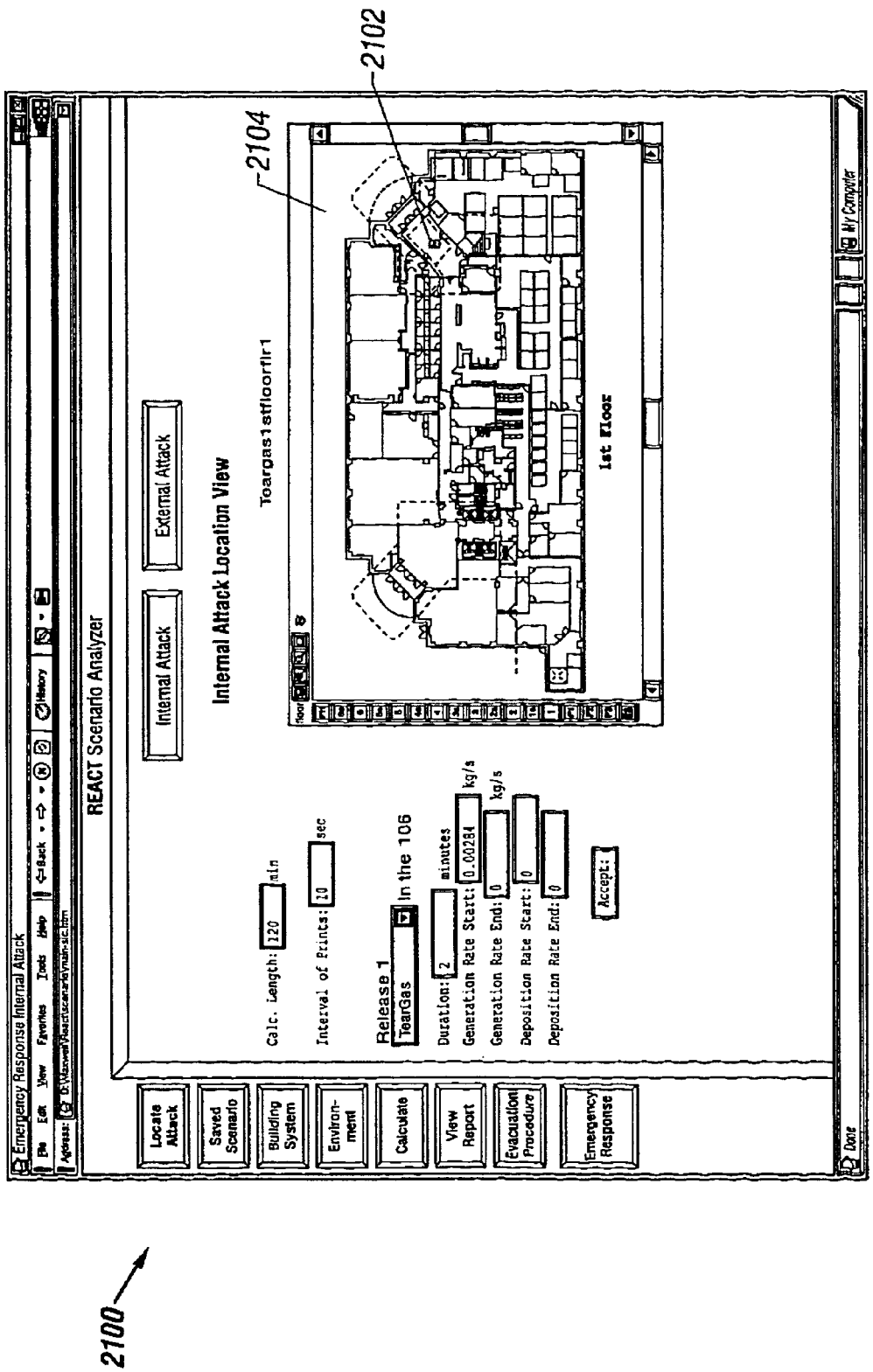
FIG. 21 is a computer display generated by the response determination module for analyzing another emergency scenario.

FIG. 21 is a computer display 2100 generated by the response determination module 110 for analyzing another emergency scenario. In this example, 12 ounces of tear gas are released at a location 2102 shown on the area map 2104 of a building.

Figure 22:
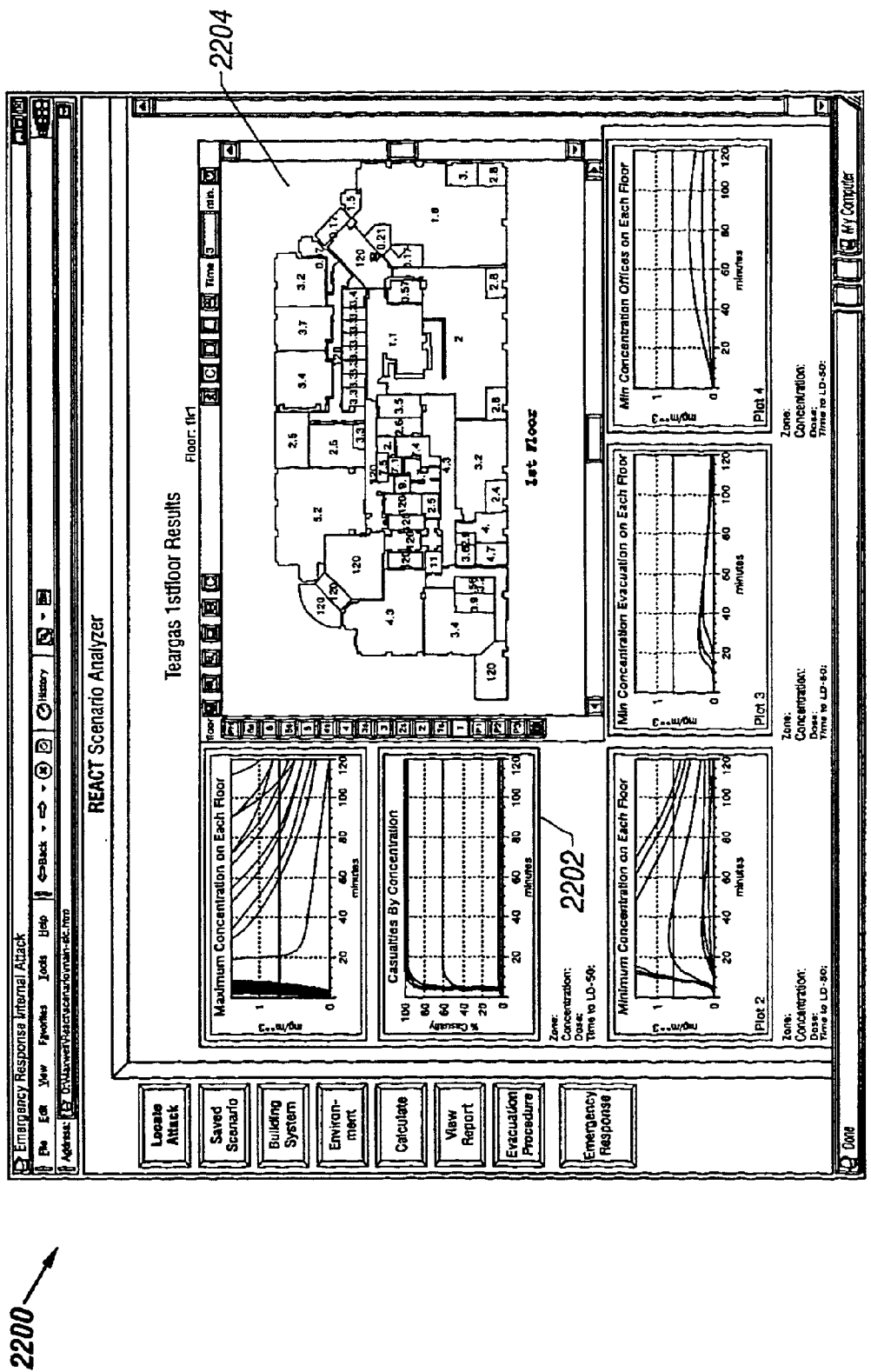
FIG. 22 is a computer display generated by the response determination module displaying a chart of predicted casualties and an area plot of tear gas contamination throughout the building for the emergency scenario identified in FIG. 21 if no emergency response is implemented.

FIG. 22 is a computer display 2200 generated by the response determination module 110 displaying a chart of predicted casualties (incapacitated personnel) 2102 and an area plot 2104 of tear gas contamination throughout the building for the emergency scenario identified in FIG. 21 if no emergency response is implemented.

Figure 23:
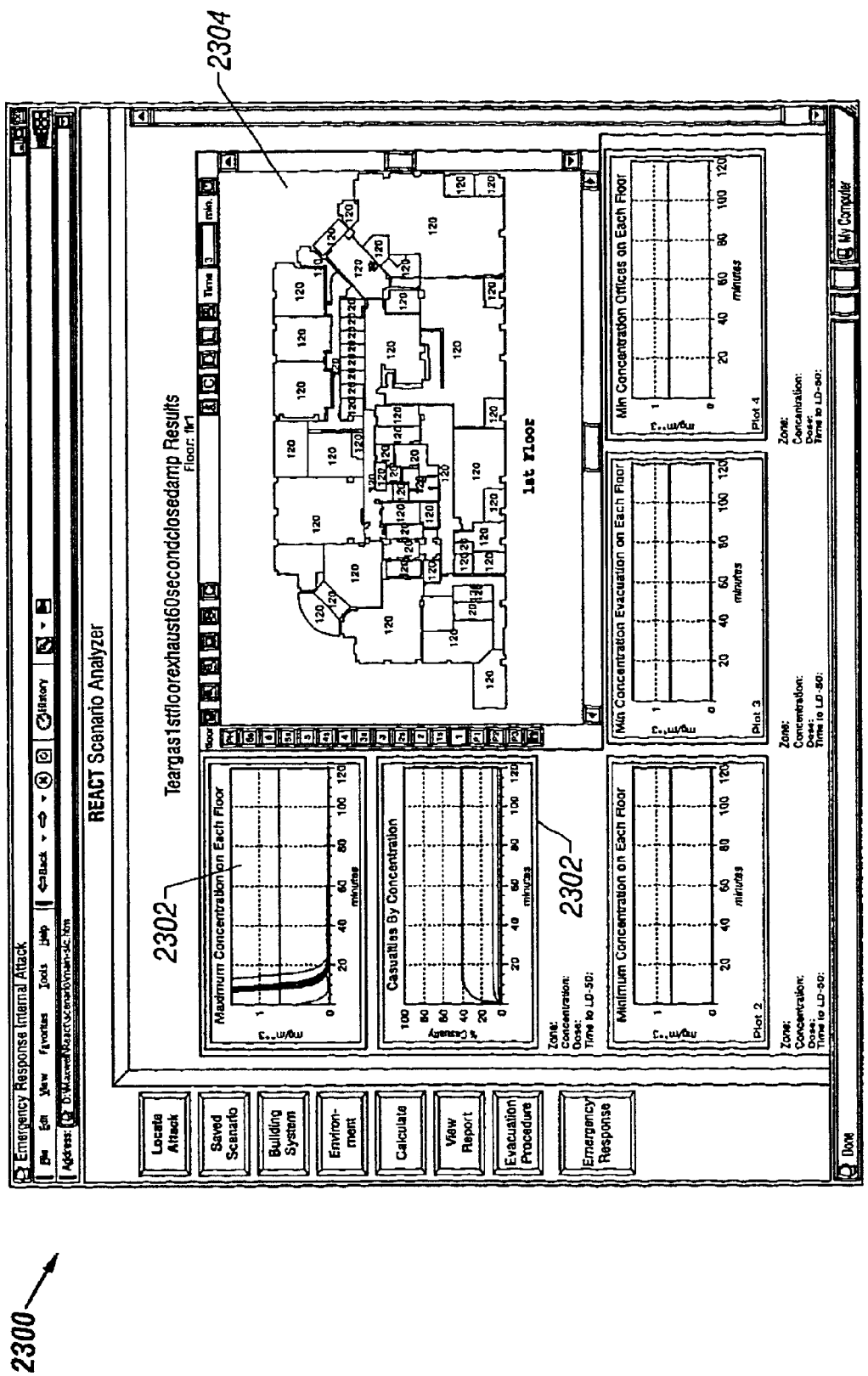
FIG. 23 is a computer display generated by the response determination module displaying a chart of predicted casualties and an area plot of tear gas contamination of the first floor of the building for the 35 emergency scenario of FIG. 21 if the selected emergency response is carried out within one minute after the release of the tear gas.

FIG. 23 is a computer display 2300 generated by the response determination module 110 displaying a chart of predicted casualties 2302 and an area plot 2304 of tear gas contamination of the first floor of the building for the emergency scenario of FIG. 21 if the emergency response of configuring the HVAC systems in the building for exhaust and closing the return dampers on all floors except the first floor is carried out within one minute after the release of the tear gas.

Figure 24:
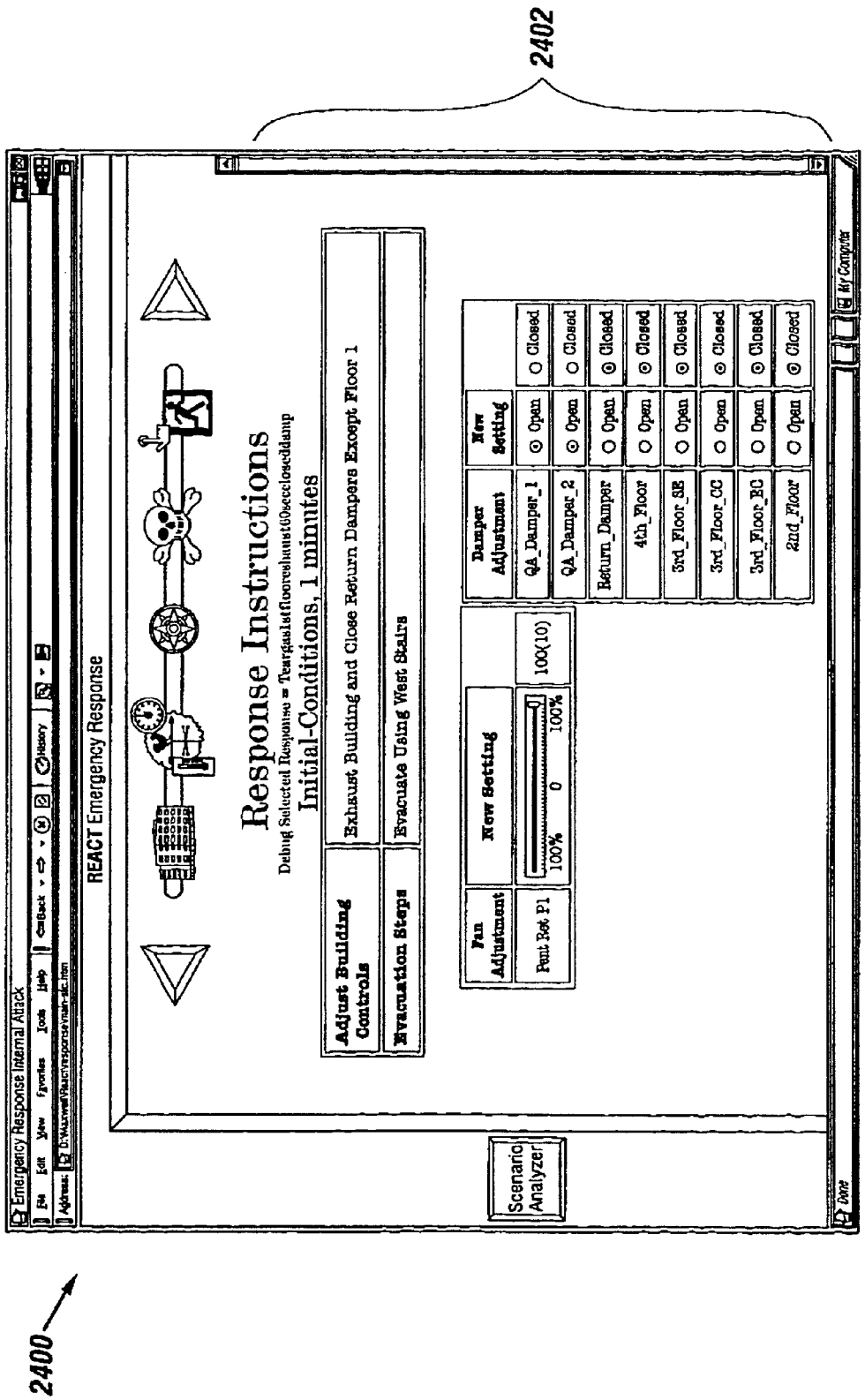
FIG. 24 is a computer display generated by the instruction display module and the facility control module displaying instructions for executing the emergency response of FIG. 23 within seconds after the identification of the tear gas release.

FIG. 24 is a computer display 2400 generated by the instruction display module 120 and the facility control module 136 displaying instructions 2402 for executing the emergency response of FIG. 23 within seconds after the identification of the tear gas release. As may be appreciated from a comparison if FIGS. 22 and 23, the number of casualties and the spreading of tear gas is substantially reduced by implementing the selected emergency response generated by the response determination module 110. Instructions for relocating personnel and operating building equipment are displayed by the instruction display module 120 and the facility control module 136.

While the above description contemplates the use of the specific modeling programs described above, the present embodiments are implemented using a modular design. As superior modeling tools are developed, or as specific modeling tools are identified as being superior for specific applications, such modeling tools can readily be incorporated into these and other embodiments according to the present invention.

The emergency response system embodiments described above provide an intelligent process capable of estimating the location and assessing the nature of a hazardous substance release, predicting the consequences of the hazardous substance release based on current environmental conditions, facility operational configuration and occupancy, and determining countermeasures in real time to minimize damage to a facility and its occupants. The countermeasures include providing instructions to safely evacuate personnel from contaminated areas, to configure the operation of HVAC equipment to minimize spreading the hazardous substance, to notify when areas may become hazardous to enter or safe for entry and use.

Other modifications, variations, and arrangements of the present invention may be made in accordance with the above teachings other than as specifically described to practice the invention within the spirit and scope of the following claims.

What is claimed is:

1. A method for generating an automated response to an emergency, comprising the steps of:

receiving a plurality of first inputs relevant to one or more emergency conditions;

storing combinations of one or more of the first inputs and states of the first inputs in an incident matrix and associating each of the combinations of the first inputs with one of the emergency conditions;

analyzing the combinations of the first inputs to generate a matrix of emergency response options for each of the combinations of the first inputs;

selecting an emergency response from the matrix of emergency response options to minimize human casualties for each of the combinations of the first inputs;

arranging the selected emergency response associated with each of the combinations of the first inputs in a response matrix;

receiving one or more second inputs relevant to threat conditions;

checking the one or more second inputs against the selected emergency responses to the combinations of the first inputs for a false alarm; and identifying from the incident matrix one of the emergency conditions corresponding to a combination of the second inputs.

2. The method of claim 1, further comprising:

selecting from the response matrix one of the emergency responses corresponding to the identified emergency condition.

3. A system for generating an automated response to an emergency, comprising:

an incident matrix sets up to receive a plurality of first inputs relevant to one or more emergency conditions, stores combinations of one or more of the first inputs, and associates each of the combinations of the first inputs with an emergency scenario;

a first module that receives and analyzes the emergency scenarios from the incident matrix to generate a matrix of one or more emergency response options for each of the emergency scenarios, wherein the first module further selects an emergency response from the matrix of emergency response options to minimize human casualties for each of the emergency scenarios;

a response matrix that receives the selected emergency responses for the emergency scenarios and arranges each of the selected emergency responses with a corresponding one of the emergency scenarios;

a second module that receives one or more second inputs relevant to threat conditions and the selected emergency responses for the emergency scenarios, wherein the second module checks the one or more second inputs for a false alarm based on the selected emergency scenarios for the emergency scenarios; and a third module that receives the emergency scenarios from the incident matrix and a combination of the second inputs from the second module and identifies the combination of the second inputs as one of the emergency scenarios.

4. The system of claim 3, further comprising:

an incident specific response generator that receives the identified emergency condition from the third module and the selected emergency response corresponding to the identified emergency scenario from the response matrix and outputs emergency instructions based on the corresponding selected emergency response.

5. The system of claim 3, wherein the first module comprises:

a fourth module that receives and analyzes the emergency scenarios from the incident matrix and generates one or more of the emergency response options for each of the emergency scenarios;

a matrix for maintaining the generated emergency response options for the emergency scenarios; and a fifth module that selects the emergency response from the matrix of emergency response options to minimize human casualties for each of the emergency scenarios.

* * * * *